United States Patent
Ohkubo (10) Patent No.: US 8,023,394 B2
(45) Date of Patent: Sep. 20, 2011

(54) OPTICAL DATA RECORDING MEDIUM AND METHOD OF MANUFACTURING THE SAME

(75) Inventor: Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 1152 days.

(21) Appl. No.: 11/744,619

(22) Filed: May 4, 2007

(65) Prior Publication Data

US 2007/0263525 A1 Nov. 15, 2007

(30) Foreign Application Priority Data

May 10, 2006 (JP) .................................. 2006-131129

(51) Int. Cl.
*G11B 7/24* (2006.01)
(52) U.S. Cl. .................................................. 369/275.3
(58) Field of Classification Search ........................ None
See application file for complete search history.

(56) References Cited

U.S. PATENT DOCUMENTS

2003/0076775 A1* 4/2003 Sato et al. ................... 369/275.3
2005/0122888 A1* 6/2005 Sakaue et al. ............... 369/275.3

FOREIGN PATENT DOCUMENTS

| JP | 2002-313031 A | 10/2002 |
| JP | 2005-135569 A | 5/2005 |
| JP | 2005196942 | 7/2005 |
| TW | 200519937 A | 6/2005 |
| WO | WO 02/37483 A1 | 5/2002 |

* cited by examiner

*Primary Examiner* — Joseph Feild
*Assistant Examiner* — Henok Heyi
(74) *Attorney, Agent, or Firm* — Sughrue Mion, PLLC

(57) ABSTRACT

A method is provided for manufacturing an optical data recording medium including a plurality of data recording layers each having a user data recording region and a BCA formation region positioned at an inner position than the data recording region. The method includes: forming a first data recording layer out of the plurality of data recording layers on a first substrate; forming a second data recording layer out of the plurality of data recording layers on a second substrate; forming a BCA pattern within the BCA formation region of the second data recording layer to record burst cut data; and bonding the first and second substrates after the BCA pattern is formed.

4 Claims, 7 Drawing Sheets

L0:ZERO-TH DATA RECORDING LAYER
L1:FIRST DATA RECORDING LAYER

OPTICAL DATA RECORDING MEDIUM AND METHOD OF MANUFACTURING THE SAME

BACKGROUND OF THE INVENTION

1. Field of the Invention

The present invention relates to an optical data recording medium and method of manufacturing the same, more particularly, relates to formation of a burst cut area (BCA) within an optical data recording medium.

2. Description of the Related Art

Optical discs, which are configured to record and reproduce data by using a laser beam, are widely-used recording media. Optical discs include read-only optical discs on which a series of emboss pits are formed in the disc manufacture process, such as CD-ROMs and DVD-ROMs, write-once optical discs, such as CD-Rs and DVD-Rs, and rewritable optical discs, such as CD-RWs, DVD-RWs and DVD-RAMs.

In general, an optical disc is designed to record and reproduce data by laser beam irradiation on a data recording layer through a transparent substrate. Within the data recording layer, a pit array or a groove is formed along a spiral recording track.

Figure 1A:
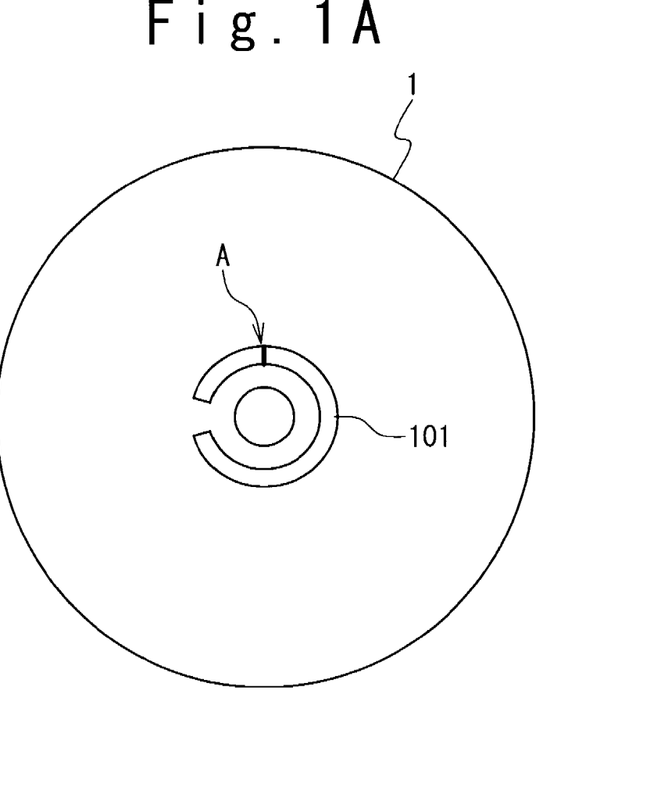
FIG. 1A is a plan view illustrating the structure of an optical data recording medium.
Figure 1B:
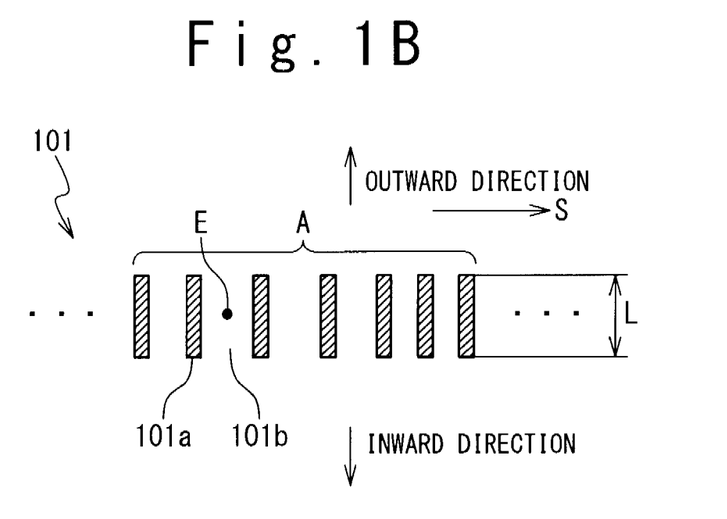
FIG. 1B is an enlarged view illustrating the structure of a burst cut area "BCA" incorporated within the optical data recording medium shown in FIG. 1A.

One sort of optical disc includes a burst cut area (BCA) which is a data recording region provided separately from the spiral recording track. As shown in FIG. 1A, a BCA 101 is provided at a predetermined radial position in the inner region of the optical disc. As shown in FIG. 1B, which illustrates an enlarged view of a portion A of the BCA 101, a set of radially-extending segments 101a having a low reflectance are formed within the BCA 101, and the BCA 101 records desired data as the pattern of the low-reflectance segments 101a. The BCA 101 is as sort of a bar code formed circumferentially. Hereinafter, the pattern of the low-reflectance segments 101a may be referred to as the BCA pattern and the data recorded within the BCA 101 may be referred to as the burst cut data. The BCA 101 may be provided along a part of a circumference as shown in FIG. 1A, or provided along the whole of a circumference. The burst cut data recorded in the BCA 101 typically include identifier for identifying the optical disc, optical disc type data (such as, read-only, write-once and rewritable) and copyright control data.

Referring back to FIG. 1B, the low-reflectance segments 101a are circumferentially arranged at a predetermined radial position of the optical data recording medium. The segments 101a have a fixed length along the radial direction, and the segments 101a are patterned along the circumference, depending on data to be recorded. It should be noted that a recording track, which is to be tracked by the laser spot, is not provided within the BCA 101. The SCA 101 is scanned by the laser spot along the circumference direction indicated by the arrow S, which is same as the disc rotation direction. The reflected light intensity changes depending on the BCA pattern (that is, the pattern of the low-reflectance segments 101a and the high-reflectance portions 101b), and the change in the reflected light intensity is detected as a signal. This signal is used for reproducing the data recorded in the BCA 101.

Compared with data recording with pits, one advantage of the data recording onto the BCA is that the use of the BCA allows recording different data onto different optical data recording media. For example, the use of BCA allows recording copyright control data onto each optical data recording medium. One approach of the BCA formation within a read-only optical data recording medium is to partially remove a metal reflective film within a data recording layer by irradiation of a strong laser beam, and to thereby form low-reflection segments within the read-only optical data recording medium. This approach is inferior in the fineness, compared with the formation of pits. For example, the low-reflectance segments 101a actually have a width of about 10 µm or more, and the largest interval between adjacent low-reflectance segments 101a is 100 µm or more.

Figure 2:
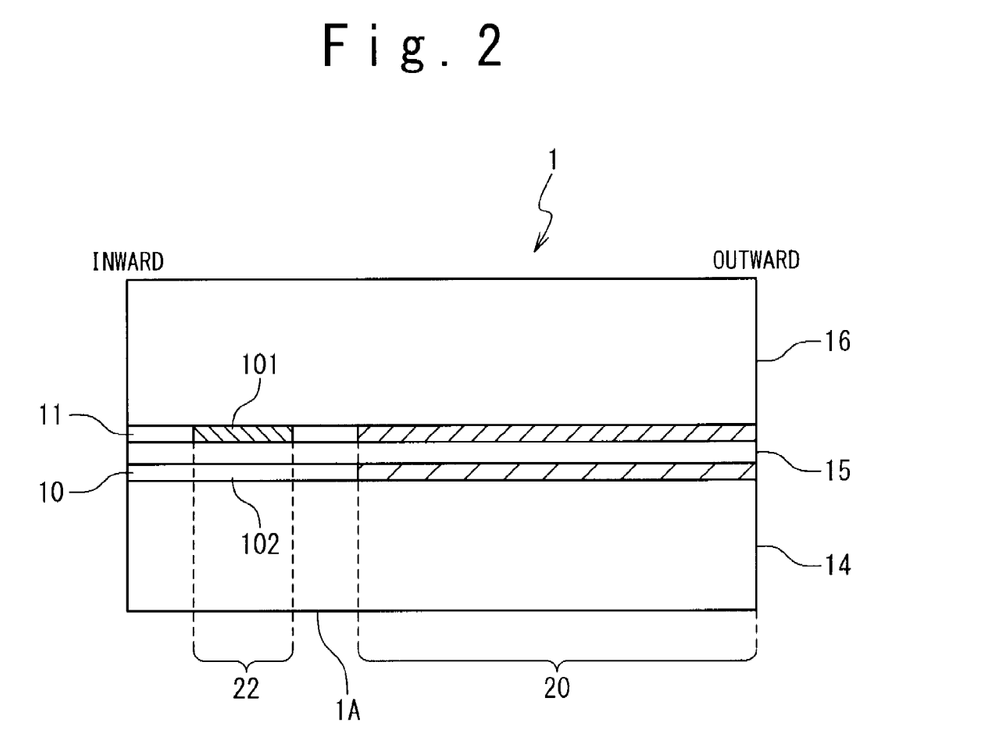
FIG. 2 is a section view illustrating the section structure of the optical data recording medium shown in FIG. 1.

Recently, optical discs with two data recording layer have become commercially available, which are adapted to record and reproduce data through one light-incident surface. FIG. 2 illustrates an example of the section structure of an optical data recording medium with two data recording layers. The optical data recording medium of FIG. 2, denoted by the numeral 1, incorporates a zero-th data recording layer 10 and a first data recording layer 11. Each of the data recording layers 10 and 11 includes a film stack including a phase-change recording film. The data recorded onto the data recording layers 10 and 11 are reproduced by using a focused beam irradiated through the light-incident surface 1A.

The distance between the zero-th data recording layer 10 and the first data recording layer 11 is preferably in the range in which the aberration of the focused beam passing through a transparent substrate 14 of the optical data recording medium 1 is not largely changed. Therefore, the distance is adjusted to about 50 µm in a DVD-ROM, for example. In this case, the diameter of the focused beam at the zero-th data recording layer 10 is about 40 µm when the focused beam is focused on the first data recording layer 11. This value is in the same order as intervals of the low-reflectance segments 101a within the BCA 101.

Therefore, when the focused beam is focused on one of the data recording layers 10 and 11, the focused beam experiences considerable interference caused by the other of the data recording layers 10 and 11. In order to avoid this, the BCA is formed within only one of the two data recording layers 10 and 11.

In this case, it would be advantageous if the BCA is formed within predetermined one of the data recording layers 10 and 11; this effectively reduces the time duration necessary for a recording apparatus or a reproducing apparatus to identify the optical data recording medium. When the data recording layer with the BCA is unknown, it is necessary to access both of the data recording layers 10 and 11 to find the BCA. When the BCA is formed within fixed one of the data recording layers 10 and 11, on the other hand, the data recorded within the BCA is reproduced in a short time through accessing only one of the data recording layers in which the BCA is formed.

Figure 3A:
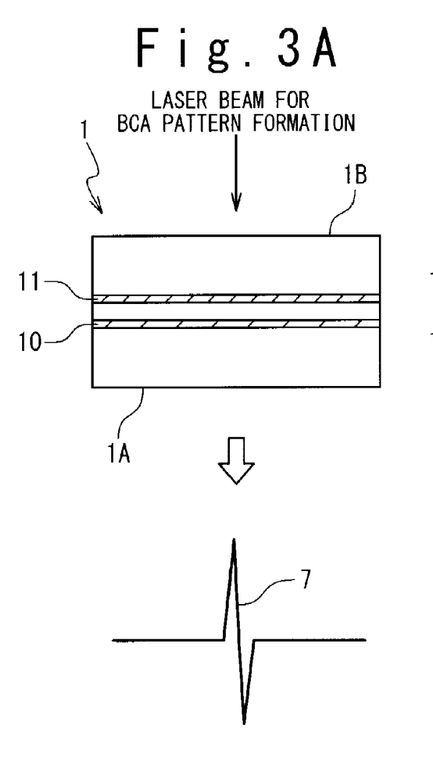
FIGS. 3A and 3B illustrate the relation between directions of laser beams and focus error signals in BCA pattern formation.

When the optical data recording medium 1 is a read-only medium with two data recording layers, the first data recording layer 11 incorporates a metal reflection layer to provide a sufficient amplitude for a reproduced signal. As shown in FIG. 3A. a BCA is formed for such read-only medium through irradiating a laser beam through another light-incident surface is, which is opposed to the light-incident surface 1A used for the data recording and reproduction; such technique is disclosed in Japanese Laid Open Patent Application No. JP-A 2005-135569 and the corresponding U.S. Patent Application Publication NO. 2005/0078594. The metal reflective film within the first data recording layer 11 is partially removed by the laser beam to thereby form the BCA. Data reproduction from the first data recording layer 11 is achieved with a laser beam passing through the zero-th data recording layer 10. Therefore, the first data recording layer 11 is formed to have an increased reflectance sufficient for providing a necessary amplitude for the reproduced signal. Typically, the metal reflective film within the first data recording layer 11 has an increased film thickness so that the transmittance of the metal reflective film is reduced down to 10% or less.

When the transmittance of the zero-th data recording layer 10 is T0 and the individual reflectance of the first data recording layer 11 is R1, the total reflectance R of the structure composed of the zero-th and first data recording layers 10 and 11 is represented by the following formula:

$$R = R1 \times T0.$$

The individual reflectance R1 of the first data recording layer 11 should be increased up to 60% or more for increasing the total reflectance R up to 15% or more, when the transmittance T0 of the zero-th data recording layer 10 is 50%. When a silver reflective film is incorporated within the first data recording layer 11, for example, the silver reflective film is required to have a thickness of about 50 nm for achieving a reflectance of 60%. In this case, the first data recording layer 11 has a transmittance of about 10%. Therefore, when a laser beam is radiated from the side of the first data recording layer 11, the laser beam seldom transmits through the first data recording layer 11. The reflection beam from the zero-th data recording layer 10 is not detected, and this allows the focus servo control to surely focus the laser beam on the first data recording layer 11.

As for a rewritable optical disc, the BCA is formed through irradiating a laser beam on a phase-change film to change the optical characteristics thereof, instead of removing the metal reflective film; this process is similar to that of recording user data onto the rewritable optical disc. For a read-only medium in which each data recording layer consists of a single metal film, the BCA is formed through partially removing the metal reflective film by using a laser beam. However, such process is not applicable to rewritable optical disc, in which each data recording layer consists of a film stack. It is difficult to finely remove all the desired portions of the film stack by laser irradiation. The BCA formation within a rewritable optical disc is achieved by using an approach similar to user data recording.

For the BCA formation of a read-only medium, a laser beam is irradiated from the side of the first data recording layer 11. This allows surely focusing the laser beam on the first data recording layer 11. The formation of a BCA within a rewritable multilayer optical disc, on the other hand, requires irradiating a laser beam from the side of zero-th data recording layer 10. The reason is as follows: Since the first data recording layer 11 incorporates a metal reflective film having a low transmittance, the laser beam irradiated from the side of the first data recording layer 11 is hard to transmit the first data recording layer 11. Therefore, the intensity of the laser beam transmitted through the first data recording layer 11 is not so high that the temperature of the phase-change film is increased to change the optical characteristics thereof. This implies that the BCA formation requires irradiating a laser beam from the zero-th data recording layer 10, which has a high transmittance, to thereby increase the temperature of the phase-change recording film within the first data recording layer 11.

Figure 3B:
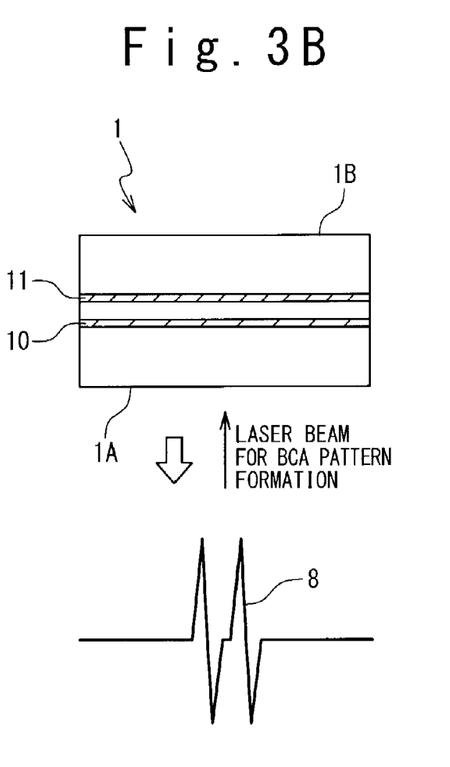

However, the laser beam is not necessarily focused on the first data recording layer 11, when the laser beam is irradiated from the side of the zero-th data recording layer 10. For a read-only medium, in which the first data recording layer 11 has an extremely low transmittance, a change of a focus error signal 7, which is often called the S-shaped curve, is observed only once as shown in FIG. 3A, when the laser beam is irradiated from the side of the first data recording layer 11. As for a rewritable optical disc, on the other hand, two S-shaped curves are observed as shown in FIG. 3B, one of which is caused by the zero-th data recording layer 10, and the other is caused by the first data recording layer 11. The laser beam is controlled to be focused on the first data recording layer 11 on the basis of one obtained from the first data recording layer 11 out of the two S-shape curves. However, the laser beam may be erroneously focused on the zero-th data recording layer 10, due to the S-shape curve obtained from the zero-th data recording layer 10. When the laser beam is erroneously focused on the zero-th data recording layer 10, the BCA is undesirably formed within the zero-th data recording layer 10. A multilayer optical disc in which a BCA is formed within the zero-th data recording layer 10 is an unusable defective product.

Correspondingly, the laser beam is required to be focused on the zero-th data recording layer 10 when a BCA is formed within the zero-th data recording layer 10; however, the laser beam may be erroneously focused on the first data recording layer 11, and a BCA may be accidentally formed within the first data recording layer 11.

As described above, fixing the data recording layer within which the BCA is formed effectively reduce the time duration necessary for medium identification; however, the conventional approach suffers from a difficulty in surely forming a BCA within a desired data recording layer in a rewritable data recording medium with multiple data recording layers. A rewritable data recording medium with multiple data recording layers in which a BCA is formed within an undesired data recording layer is an unusable defective product.

Japanese Laid Open Patent Application No. WO2002/037483 and the corresponding U.S. Patent Application Publication No. 2003/0076775 disclose a technique for forming a BCA within an optical disc with two data recording layers. In this technique, first and second data recording layers are formed on first and second substrates, respectively, and then a BCA is formed only within the first data recording layer. This is followed by bonding the first and second substrates by an intermediate layer. Japanese Laid Open Patent Application No. JP-A 2002-313031 and the corresponding U.S. Patent Application Publication No. 2002/0150031 disclose a similar technique.

SUMMARY OF THE INVENTION

Therefore, an object of the present invention is to surely form a BCA within a desired data recording layer in a rewritable data recording medium with multiple data recording layers.

In an aspect of the present invention, a method is provided for manufacturing an optical data recording medium including a plurality of data recording layers each having a user data recording region and a BCA formation region positioned at an inner position than the data recording region, the method including: forming a first data recording layer out of the plurality of data recording layers on a first substrate; forming a second data recording layer out of the plurality of data recording layers on a second substrate; forming a BCA pattern within the SCA formation region of the second data recording layer to record burst cut data; and bonding the first and second substrates after the formation of the BCA pattern.

Preferably, BCA pattern is formed through partially crystallizing the BCA formation region of the second data recording layer.

The manufacturing method preferably further includes: initializing the user data recording regions of the first and second data recording layers after the first and second substrates are bonded.

In a preferred embodiment, the first and second substrates are bonded so that the first and second data recording layer are opposed to each other across an intermediate layer.

In another aspect of the present invention, an optical data recording medium is provided with first and second data recording layers each including a phase-change recording film, the plurality of data recording layers being configured to be accessed from the same incident surface. The first and second data recording layers each include a user data recording region and a BCA formation region positioned at an inner position than the data recording region. Burst cut data are recorded within the second data recording layers through partial crystallization of the BCA formation region thereof before bonding the first and second data recording layers each other.

In still another aspect of the present invention, a method is provided for manufacturing an optical data recording medium including a plurality of data recording layers each having a user data recording region and a BCA formation region positioned at an inner position than the data recording region, the method including: crystallizing the whole area of the BCA formation region of a first data recording layer selected out of the plurality of data recording layers; and forming a BCA pattern within the BCA formation region of a second data recording layer selected out of the plurality of data recording layers to record burst cut data, after the crystallization.

When the manufacturing method further includes: forming the first data recording layer on a first substrate; and forming the second data recording layer on a second substrate, the first and second substrates are preferably bonded after the whole area of the BCA formation region of the first data recording layer is crystallized.

Alternatively, the whole area of the BCA formation region of the first data recording layer may be crystallized after the first and second substrates are bonded. In this case, the whole area of the BCA formation region of the first data recording layer may be crystallized so as to erase burst cut data erroneously recorded in the BCA formation region of the first data recording layer before the crystallizing.

In still another aspect of the present invention, an optical data recording medium includes: first and second data recording layers each including a phase-change recording film, the plurality of data recording layers being configured to be accessed from the same incident surface. The first and second data recording layers each include a user data recording region and a BCA formation region positioned at an inner position than the data recording region. The whole area of the BCA formation region of the first data recording layer is crystallized, and the BCA formation region of the second data recording layer is partially crystallized to record burst cut data therein.

In a preferred embodiment, the whole area of the BCA formation region of the first data recording layer is crystallized before the BCA formation region of the second data recording layer is partially crystallized. The whole area of the BCA formation region of the first data recording layer may be crystallized so as to erase burst cut data erroneously recorded in the BCA formation region of the first data recording layer.

BRIEF DESCRIPTION OF THE DRAWINGS

The above and other advantages and features of the present invention will be more apparent from the following description taken in conjunction with the accompanied drawings, in which.

DESCRIPTION OF THE PREFERRED EMBODIMENTS

Preferred embodiment of the present invention will be described below in detail with reference to the attached drawings.

In one embodiment, a multilayer optical data recording medium incorporates a burst cut area (BCA) which is a data recording region provided separately from the spiral recording track. Data recorded in the burst cut area are reproducible through irradiating a laser beam. As shown in FIG. 1A, the BCA, denoted by the numeral 101, is provided at a predetermined radial position in the inner region of an optical data recording medium 1. As shown in FIG. 1B, a set of radially-extending segments 101a having a low reflectance are formed within the BCA 101, and the BCA 101 records desired data as the BCA pattern, which is the pattern of the low-reflectance segments 101a. The BCA 101 is as sort of a bar code formed circumferentially. The BCA 101 may be formed along a part of a circumference as shown in FIG. 1A, or formed along the whole of a circumference. The BCA 101 records burst cut data including identifier for identifying the optical recording medium, optical disc type data (such as, read-only, write-once and rewritable) and copyright control data.

Referring back to FIG. 1B, the width of the BCA 101 in the radial direction (that is, the length L of the respective low-reflectance segments 101a within the BCA 101) is increased to sufficiently exceed the eccentric distance of a recording track. In one embodiment, the width of the BCA 101 is about one millimeter.

The low-reflectance segments 101a are circumferentially arranged at a predetermined radial position of the multilayer optical data recording medium. The segments 101a have a fixed length L along the radial direction, and the segments 101a are patterned along the circumference, depending on data to be recorded. The data are recorded as changes in intervals between adjacent low-reflectance segments 101a, which has a fixed width. This data recording method is advantageous in the light of the manufacture easiness, since the respective low-reflectance segments 101a, which have the same reflectance, can be formed by laser irradiation at different positions. The data may be recorded with different widths of the low-reflectance segments 101a and the high-reflectance portions 101b.

It should be noted that there is no track to be tracked by the laser spot within the BCA 101. In reproducing data recorded onto the BCA 101, the optical disc drive does not perform the track servo control for the BCA 101; the optical disc drive performs only the focus servo control in accessing the BCA 101. Therefore, the BCA 101 is scanned by a laser spot E along the circumference direction indicated by the arrow S, which is same as the disc rotation direction. During the scanning, the reflected light intensity changes depending on the pattern of the low-reflectance segments 101a and the high-reflectance portions 101b, and the change in the reflected light intensity is detected as a signal. This signal is used for reproducing the data recorded in the BCA 101.

FIG. 2 is an enlarged view partially illustrating the section structure of the multilayer data recording medium in this embodiment. The multilayer optical disc in this embodiment, denoted by the numeral 1, incorporates multiple data recording layers which are accessed from the same light-incident surface. In this embodiment, as shown in FIG. 2, the number of the data recording layers within the multilayer optical data recording medium 1 is two. In other words, the multilayer optical data recording medium 1 incorporates a pair of data recording layers disposed between transparent substrates 14 and 16, the data recording layers being opposed to each other across an intermediate layer 15. One of the data recording layers, positioned near the incident surface 1A is referred to as the zero-th data recording layer 10 (or the upper recording layer), and the other is referred to as the first data recording layer 11 (or the lower recording layer). The zero-th and first data recording layers 10 and 11 are each comprised of a film stack including a dielectric film, a phase-change recording film and a reflective film, for example.

The zero-th and first data recording layers 10 and 11 each include a user data recording region 20 and a BCA formation region 22. The user data recording regions 20 are each provided with a recording track used to record user data. The BCA formation regions 22 have a constant width in the radial direction, and are positioned at a radially inner position than the user data recording regions 20. A burst cut area (BCA) 101 is provided within the BCA formation region 22 of the first data recording layer 11. On the other hand, the BCA formation region 22 of the zero-th data recording layer 10 has a mirror face, having a constant reflectance thereover. The BCA formation region 22 of the zero-th data recording layer 10 is opposed to the burst cut area 101 within the first data recording layer 11, and therefore may be referred to as the BCA opposing region 102, hereinafter.

Formation of a BCA pattern within the BCA 101 (that is, recording of burst cut data onto the BCA 101) may be achieved by using an initialization apparatus prepared for phase-change optical discs, such as DVD-RWs and DVD-RAMs. The focus spot of the laser beam emitted from this initialization apparatus is about 50 μm long in the radial direction and 1 μm wide in the disc rotation direction (the circumferential direction). During the irradiation, the laser beam is repeatedly displaced in steps of several tens micrometers. This allows the forming a BCA pattern with a width of 1 mm in a short time.

The in-situ state of the phase-change recording film is amorphous, and therefore the BCA pattern is formed by partially crystallizing the phase-change recording film within the BCA 101 and thereby forming low-reflectance segments 101a. The formation of the BCA pattern within the BCA 101 is achieved by irradiating the laser beam from the incident surface positioned near the zero-th data recording layer 10. As described above, one problem is that the irradiation of the laser beam from the side of the zero-th data recording layer 10 may result in that the BCA pattern is not formed within the desired data recording layer (that is, the first data recording layer 11 in this embodiment), but within the different data recording layer (that is, the zero-th data recording layer 10 in this embodiment).

In order to avoid this problem, the BCA pattern is formed through one selected out of three methods described in the following:

(1) Forming BCA Pattern before Substrate Bonding

Figure 4:
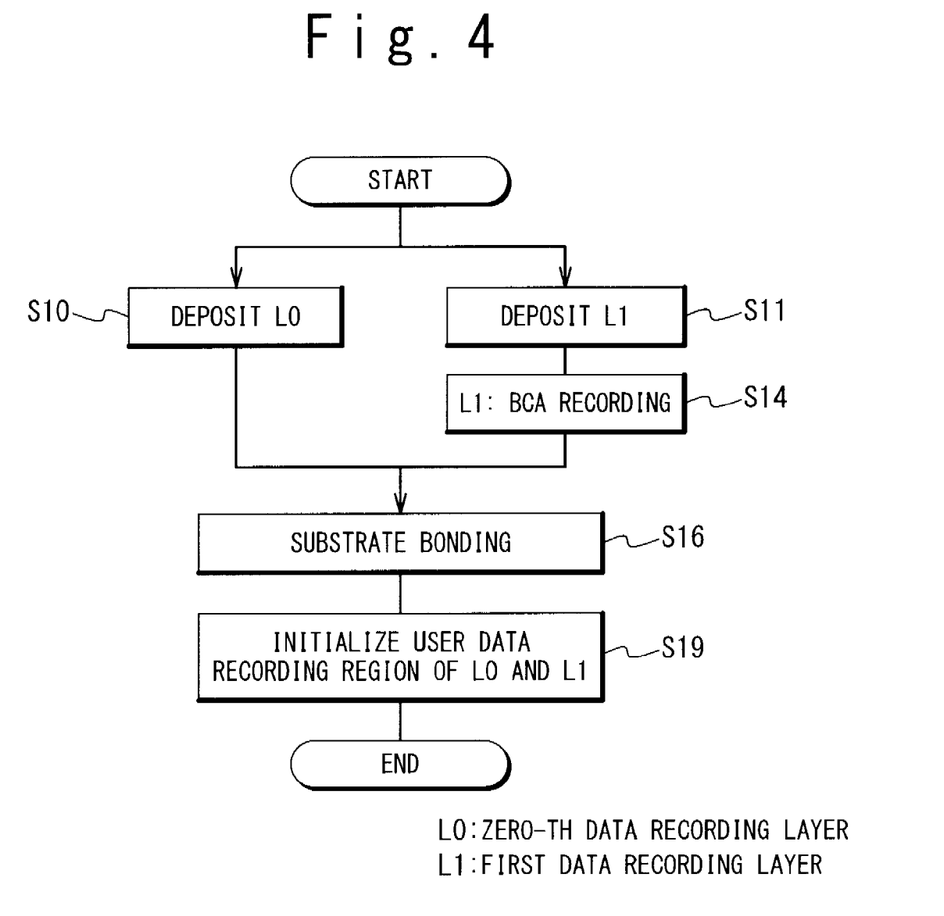
FIG. 4 is a flowchart illustrating a first preferred process of BCA pattern formation.

FIG. 4 is a flowchart illustrating a preferred BCA pattern formation process. This process begins with forming the zero-th data recording layer 10 on the substrate 14 at Step S10, and forming the first data recording layer 11 on the substrate 16 at Step S11. Subsequently, a BCA pattern is formed within the BCA formation region 22 of the first data recording layer 11 at Step S14. The formation of the BCA pattern is achieved by partially crystallizing the BCA formation region 22 of the first data recording layer 11 through laser beam irradiation. This is followed by bonding the substrates 14 and 16 at Step S16. After the substrate bonding, the zero-th data recording layer 10 is opposed to the first data recording layer 11 across the intermediate layer 15. Subsequently, the user data recording region 20 of the zero-th and first data recording layers 10 and 11 are initialized.

After the above-described process completes, the BCA formation region 22 of the first data recording layer 11 functions as the BCA 101, while the BCA formation region 22 of the zero-th data recording layer 10 functions as the BCA opposing region 102 with a constant reflectance.

An advantage of the above-described process is that there is no possibility in which the BCA pattern is erroneously formed within the zero-th data recording layer 10 instead of the first data recording layer 11. This owes to the fact that the BCA pattern is formed before the substrate bonding.

Figure 5:
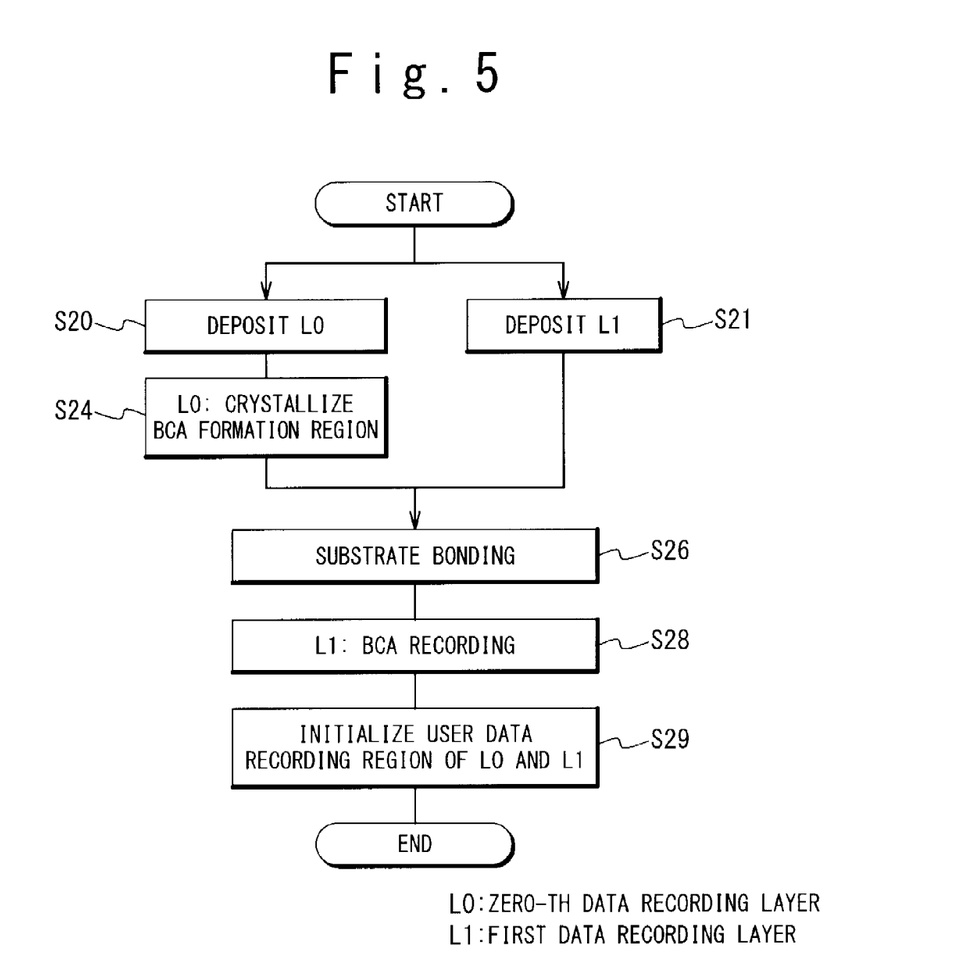
FIG. 5 is a flowchart illustrating a second preferred process of BCA pattern formation.

(2) Crystallizing One BCA Formation Region Before Substrate Bonding, and Forming BCA Pattern within Another BCA Formation Region Thereafter FIG. 5 is a flowchart illustrating another preferred BCA pattern formation process. This process begins with forming the zero-th data recording layer 10 on the substrate 14 at Step S20, and forming the first data recording layer 11 on the substrate 16 at Step S21. This is followed by crystallizing the whole area of the BCA formation region 22 of the zero-th data recording layer 10 through laser beam irradiation at Step S24. This results in that the BCA formation region 22 of the zero-th data recording layer 10 functions as the BCA opposing region 102 with a constant reflectance. This is followed by bonding the substrates 14 and 16 at Step S16. After the substrate bonding, the zero-th data recording layer 10 is opposed to the first data recording layer 11 across the intermediate layer 15. Subsequently, a BCA pattern is formed within the BCA formation region 22 of the first data recording layer 11 at Step S14. The formation of the BCA pattern is achieved by partially crystallizing the BCA formation region 22 of the first data recording layer 11 through laser beam irradiation. This results in that the BCA formation region 22 of the first data recording layer 10 functions as the BCA 101. Finally, the user data recording region 20 of the zero-th and first data recording layers 10 and 11 are initialized at Step S29.

In this process, the whole area of the BCA formation region 22 of the zero-th data recording layer 10 (that is, the BCA opposing region 102) is already crystallized before the formation of the BCA pattern. Therefore, the BCA pattern is not erroneously formed within the zero-th data recording layer 10 even when the laser beam is focused on the zero-th data recording layer 10 by erroneous focus servo control.

Figure 6:
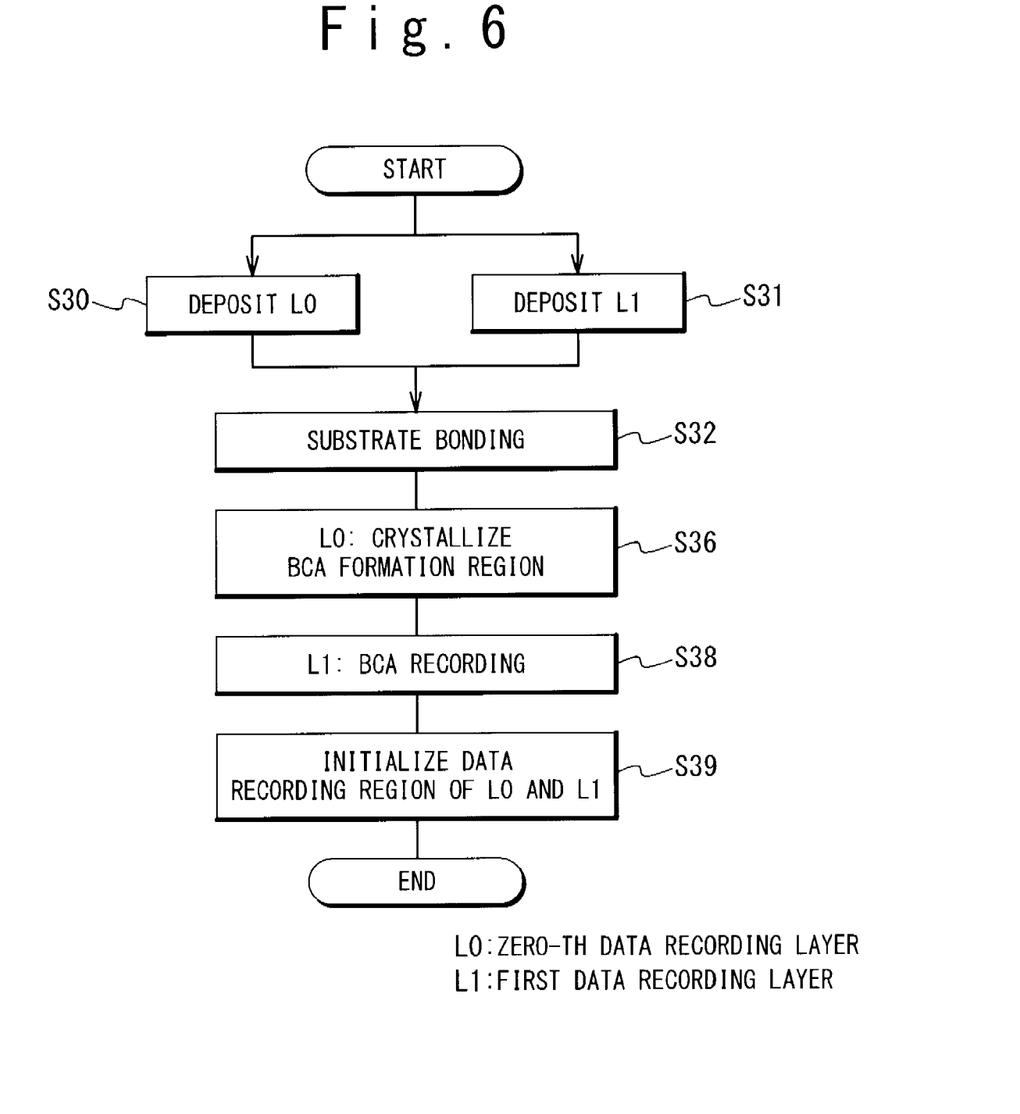
FIG. 6 is a flowchart illustrating a third preferred process of BCA pattern formation.

(3) Crystallizing One BCA Formation Region after Substrate Bonding, and Forming BCA Pattern within Another BCA Formation Region Thereafter FIG. 6 is a flowchart illustrating still another preferred BCA pattern formation process. This process begins with forming the zero-th data recording layer 10 on the substrate 14 at Step S30, and forming the first data recording layer 11 on the substrate 16 at Step S31. This is followed by bonding the substrates 14 and 16 at Step S32. After the substrate bonding, the zero-th data recording layer 10 is bonded to the first data recording layer 11 by the intermediate layer 15. This is followed by crystallizing the whole area of the BCA formation region 22 of the zero-th data recording layer 10 through laser beam irradiation at Step S36. This results in that the BCA formation region 22 of the zero-th data recording layer 10 functions as the BCA opposing region 102 with a constant reflectance. Subsequently, a BCA pattern is formed within the BCA formation region 22 of the first data recording layer 11 at Step S38. The formation of the BCA pattern is achieved by partially crystallizing the BCA formation region 22 of the first data recording layer 11 through laser beam irradiation. This results in that the BCA formation region 22 of the first data recording layer 10 functions as the BCA 101. Finally, the user data recording region 20 of the zero-th and first data recording layers 10 and 11 are initialized at Step S39.

In this process, the BCA pattern is formed within the first data recording layer 11 after the whole area of the BCA formation region 22 of the zero-th data recording layer 10 (that is, the BCA opposing region 102) is crystallized. Since the BCA formation onto the phase-change recording film is achieved by partially crystallizing the phase-change recording film in the amorphous state, the BCA pattern can not be formed within the BCA opposing region 102 after the crystallization of the whole area of the BCA formation region 22 of the zero-th data recording layer 10; there is no possibility in which the BCA pattern is erroneously formed within the zero-th data recording layer 10.

Figure 7:
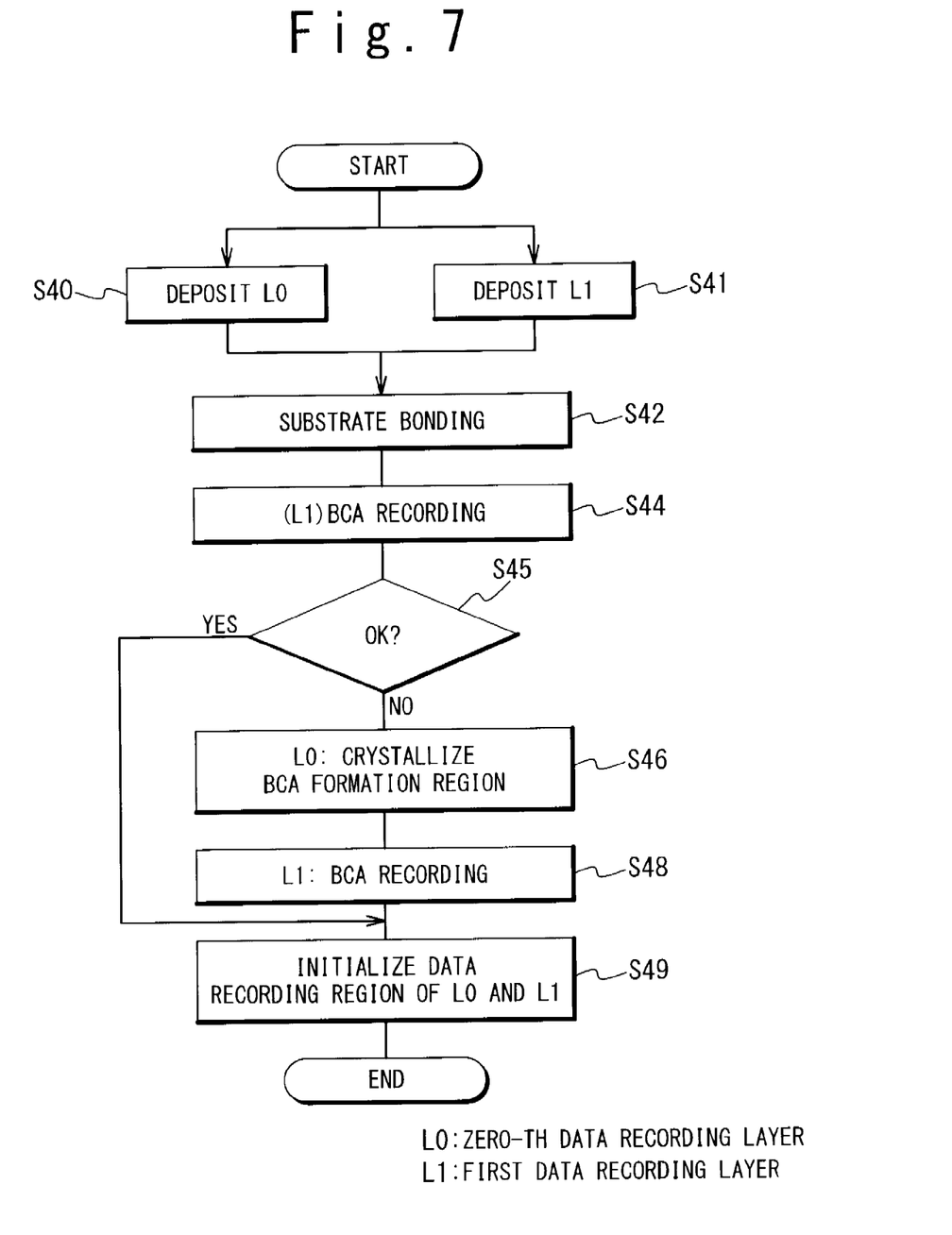
FIG. 7 is a flowchart illustrating a fourth preferred process of BCA pattern formation.

As shown in FIG. 7, the process of the crystallization of the BCA formation region 22 of the zero-th data recording layer 10 and the subsequent BCA pattern formation within the BCA formation region 22 of the first data recording layer 11 may be implemented after a BCA pattern is erroneously formed within the first data recording layer 11.

The process shown in FIG. 7 begins with forming the zero-th data recording layer 10 on the substrate 14 at Step S30, and forming the first data recording layer 11 on the substrate 16 at Step S31. This is followed by bonding the substrates 14 and 16 at Step S32. After the substrate bonding, the zero-th data recording layer 10 is bonded to the first data recording layer 11 by the intermediate layer 15. This is followed by trying to form a BCA pattern within the BCA formation region 22 of the first data recording layer 11 at Step S44. At Step S45, the BCA formation region 22 of the first data recording layer 11 is checked to determine whether the BCA pattern is correctly formed within the BCA formation region 22 of the first data recording layer 11. When the BCA pattern is erroneously formed within the BCA formation region 22 of the zero-th data recording layer 10, the whole area of the BCA formation region 22 of the zero-th data recording layer 10 is crystallized to erase the BCA pattern at Step S46. Since the BCA pattern is formed by partially crystallizing the amorphous phase-change recording film, the crystallization of the whole area of the BCA formation region 22 results in that the erroneously formed BCA pattern is erased from the BCA formation region 22. Subsequently, the BCA pattern formation is retried within the BCA formation region 22 of the first data recording layer 11 at Step S48. After the formation of the BCA pattern, the user data recording region 20 of the zero-th and first data recording layers 10 and 11 are initialized at Step S49.

The above-described processes allow improving the yield of the multilayer optical data recording media incorporating a BCA.

Experimental Result 1

In a first experiment, BCA pattern formation was implemented for an optical data recording medium with two data recording layers 10 and 11, each incorporating a phase-change recording film. A BCA pattern was tried to be formed within the first data recording layer 11. Guide grooves are formed within the user data recording regions 20 of the zero-th and first data recording layers 10 and 11, having a pitch of 0.4 µm. The BCA formation regions 22 of the zero-th and first data recording layers 10 and 11 each have a mirror face with a constant reflectance before the BCA pattern formation. The BCA formation regions 22 are provided in an area where the distance from the center ranges 22.3 to 23.2 mm.

The zero-th data recording layer 10 was formed on a polycarbonate substrate 14 of a thickness of 0.6 mm. The zero-th data recording layer 10 was comprised of a film stack of a dielectric film, a phase-change recording layer, another dielectric film, and a reflective film, which are layered in this order from the polycarbonate substrate 14. The first data recording layer 11 was formed on a polycarbonate substrate 16 of a thickness of 0.6 mm. The first data recording layer 11 was comprised of a film stack of a reflective film, a dielectric film, a phase-change recording layer, and another dielectric film, which are layered in this order from the polycarbonate substrate 16. After the deposition of the first data recording layer 11, a BCA pattern is formed within the BCA formation region 22 of the first data recording layer 11 before bonding the polycarbonate substrates 14 and 16.

The laser beam used for forming the BCA pattern had a wavelength of 780 nm, and was generated by a semiconductor laser. The objective lens used for focusing the laser beam has a numerical aperture of 0.55, and the size of the spot of the laser beam was 1 µm wide (in the rotation direction) and 50 µm long (in the radial direction). The maximum power of the laser beam was 1.5 W.

After the formation of the BCA pattern within the first data recording layer 11, the substrates 14 and 16 were bonded to complete the optical data recording medium. This was followed by data access test to the BCA 101 of the optical data recording medium. The BCA pattern was correctly reproduced in this access test, and the correct burst cut data were obtained from the BCA 101.

This experiment implies that the BCA pattern can be formed within the first data recording layer 11 before the substrate bonding, although the substrate 16, on which the first data recording layer 11 is formed, is inferior in the mechanical strength. The mechanical strength of the substrate 16, which has a reduced thickness of 0.6 mm, may be one issue in forming the BCA pattern, because the laser beam irradiation may be accompanied by thermal deformation of the substrate 16. However, the experimental result revealed that thermal deformation does not hinder the formation of the BCA pattern before the substrate bonding.

It should be noted that optical data recording media incorporating phase-change recording films usually require crystallization of data recording regions before the actual use (this crystallization process is often referred to as initialization). In this experiment, the user data recording regions 20 of the zero-th and first data recording layers 10 and 11 were initialized after the substrate bonding. The initialization (or crystallization) may be performed before the substrate bonding, following the BCA formation; however, it is more preferable that the initialization of the user data recording regions 20 is performed after the substrate bonding, since the optical data recording medium has a sufficient mechanical strength against thermal deformation after the substrate bonding.

Experimental Result 2

In a second experiment, BCA pattern formation was implemented for 100 optical data recording media with two data recording layers 10 and 11, each incorporating a phase-change recording film. BCA patterns were tried to be formed within the first data recording layers 11 of the respective optical data recording media. Guide grooves are formed within the user data recording regions 20 of the zero-th and first data recording layers 10 and 11, having a pitch of 0.4 μm. The BCA formation regions 22 of the zero-th and first data recording layers 10 and 11 each have a mirror face with a constant reflectance before the BCA pattern formation. The BCA formation regions 22 are provided in areas where the distance from the center ranges 22.3 to 23.2 mm.

The zero-th data recording layers 10 were formed on respective polycarbonate substrates 14 of a thickness of 0.6 mm. The zero-th data recording layers 10 were each comprised of a film stack of a dielectric film, a phase-change recording layer, another dielectric film, and a reflective film, which are layered in this order from the polycarbonate substrates 14. The first data recording layers 11 were formed on respective polycarbonate substrate 16 of a thickness of 0.6 mm. The first data recording layer 11 were each comprised of a film stack of a reflective film, a dielectric film, a phase-change recording layer, and another dielectric film, which are layered in this order from the polycarbonate substrate 16. The zero-th and first data recording layers 10 and 11 are bonded with intermediate layers 15 formed of UV cure adhesive to complete the 100 optical data recording media. The thickness of the intermediate layers 15 was 25 μm.

BCA patterns were tried to be formed within the first data recording layers 11 of the 100 optical data recording media by using the same initialization apparatus as the first experiment. For 80 out of the 100 optical data recording media, the BCA patterns were formed in the first data recording layers 11 as desired. For the remaining 20 optical data recording media, which are referred to as the NG discs, hereinafter, the BCA patterns were erroneously formed within the BCA formation regions 22 of the zero-th data recording layers 10. The NG discs were subjected to BCA pattern formation once more, after the crystallization of the whole areas of the BCA formation regions 22 of the zero-th data recording layers 10. The second BCA pattern formation resulted in that the BCA patterns were formed within the first data recording layers 11 as desired. The BCA patterns were correctly reproduced in the access test thereafter.

If the laser beam is erroneously focused on a first data recording layer 11 in erasing burst cut data from a BCA formation region 22 of a zero-th data recording layer 10, the whole area of the BCA formation region 22 of the first data recording layer 11 is undesirably crystallized. When this happens, it is necessary to transform the phase-change recording film within the BCA formation region 22 of the first data recording layer 11 into the amorphous state, and to form a BCA pattern within the BCA formation region 22 of the first data recording layer 11 thereafter. The transformation of the phase-change recording film into the amorphous state undesirably requires irradiation of a high power laser beam. Additionally, the use of a laser beam with an increased beam diameter may result in that the phase-change recording film are crystallized again after melting and cooling the phase-change recording film, due to the insufficient cooling rate. Therefore, the formation of the BCA pattern within the totally-crystallized BCA formation region 22 is difficult. In order to avoid the erroneous crystallization of the first data recording layer 11, it is desirable that the zero-th data recording layer 10 is subjected to the crystallization with a high laser power after the laser beam is confirmed as being focused on the zero-th data recording layer 10 through the focus servo control with a low laser power. The confirmation of the fact that the laser beam is focused on the zero-th data recording layer 10 can be achieved through monitoring the reflected beam. When the BCA pattern erroneously formed within the zero-th data recording layer 10 is reproduced, a change is detected in the intensity of the reflected beam in accordance with the BCA pattern. After the detection of the change in the intensity of the reflected beam, the laser power is increased to achieve the crystallization of the BCA formation region 22 of the zero-th data recording layer 10 (that is, erasing the burst cut data).

Experimental Result 3

In a third experiment, BCA pattern formation was implemented for 30 optical data recording media with two data recording layers 10 and 11, each incorporating a phase-change recording film. BCA patterns were tried to be formed within the first data recording layers 11 of the respective optical data recording media. Guide grooves are formed within the user data recording regions 20 of the zero-th and first data recording layers 10 and 11, having a pitch of 0.4 μm. The BCA formation regions 22 of the zero-th and first data recording layers 10 and 11 each have a mirror face with a constant reflectance before the BCA pattern formation. The BCA formation regions 22 are provided in areas where the distance from the center ranges 22.3 to 23.2 mm.

The zero-th data recording layers 10 were formed on respective polycarbonate substrates 14 of a thickness of 0.6 mm. The zero-th data recording layers 10 were each comprised of a film stack of a dielectric film, a phase-change recording layer, another dielectric film, and a reflective film, which are layered in this order from the polycarbonate substrates 14. The first data recording layers 11 were formed on respective polycarbonate substrate 16 of a thickness of 0.6 mm. The first data recording layer 11 were each comprised of a film stack of a reflective film, a dielectric film, a phase-change recording layer, and another dielectric film, which are layered in this order from the polycarbonate substrate 16. After the formation of the zero-th data recording layers 10, the BCA formation regions 22 of the zero-th data recording layers 10 (that is, the BCA opposing regions 102) were subjected to initialization (or crystallization), before the substrate bonding. This is followed by bonding the zero-th data recording layers 10 and the first data recording layers 11 with UV cure adhesive.

BCA patterns are tried to be formed within the first data recording layers 11 of the 30 optical data recording media. For five out of the 30 optical data recording media, the laser beams are erroneously focused on the zero-th data recording layers 10; however, the relevant zero-th data recording layers 10 exhibited no change, because the BCA formation regions 22 of the zero-th data recording layers 10 are already subjected to crystallization. The fact that the laser beam is erroneously focused on a zero-th data recording layer 10 can be confirmed by checking whether the burst cut data are recorded within the BCA formation region 22 of the first data recording layer 11. When the burst cut data can not be reproduced, this implies that the laser beam is erroneously focused on a zero-th data recording layer 10. The five optical data recording media for which the BCA pattern formation is unsuccessfully completed were subjected to the BCA pattern formation again. This results in that BCA patterns were formed as desired for these five optical data recording media.

In this experiment, the user data recording regions 20 of the zero-th and first data recording layers 10 and 11 were initialized after the substrate bonding. The initialization (or crystallization) may be performed before the substrate bonding, following the BCA formation; however, it is more preferable that the initialization of the user data recording regions 20 is performed after the substrate bonding, since the optical data recording medium has a sufficient mechanical strength against thermal deformation after the substrate bonding.

It is apparent that the present invention is not limited to the above-described embodiments, which may be modified and changed without departing from the scope of the invention.

What is claimed is:

1. A method of manufacturing an optical data recording medium including a plurality of data recording layers each having a user data recording region and a BCA formation region positioned at an inner position than said data recording region, said method comprising:
    forming a first data recording layer out of said plurality of data recording layers on a first substrate;
    forming a second data recording layer out of said plurality of data recording layers on a second substrate;
    forming a BCA pattern within said BCA formation region of said second data recording layer to record burst cut data;
    bonding said first and second substrates after forming said BCA pattern, and
    initializing said user data recording regions of said first and second data recording layers after said first and second substrates are bonded.

2. The method according to claim 1, wherein said BCA pattern is formed through partially crystallizing said BCA formation region of said second data recording layer.

3. The method according to claim 1, wherein said first and second substrates are bonded so that said first and second data recording layer are opposed to each other across an intermediate layer.

4. A method of manufacturing an optical data recording medium including a plurality of data recording layers each having a user data recording region and a BCA formation region positioned at an inner position than said data recording region, said method comprising:
    forming a first data recording layer on a first substrate, said first data recording layer being selected out of said plurality of data recording layers;
    forming a second data recording layer on a second substrate, said second data recording layer being selected out of said plurality of data recording layers;
    crystallizing a whole area of said BCA formation region of said first data recording layer;
    bonding said first and second substrates after said whole area of said BCA formation region of said first data recording layer is crystallized;
    forming a BCA pattern within said BCA formation region of said second data recording layer to record burst cut data, after said first and second substrates are bonded; and
    initializing said user data recording regions of said first and second data recording layers after said first and second substrates are bonded.

* * * * *